(12) United States Patent
Yang et al.

(10) Patent No.: US 8,913,020 B2
(45) Date of Patent: Dec. 16, 2014

(54) TOUCH MODULE AND TOUCH DETECTING METHOD

(75) Inventors: Chien-Sheng Yang, Hsin-Chu (TW); Li-Huang Lu, Hsin-Chu (TW); Yung-Chih Chen, Hsin-Chu (TW)

(73) Assignee: Young Lighting Technology Inc., Hsin-Chu (TW)

( * ) Notice: Subject to any disclaimer, the term of this patent is extended or adjusted under 35 U.S.C. 154(b) by 479 days.

(21) Appl. No.: 13/281,439

(22) Filed: Oct. 26, 2011

(65) Prior Publication Data

US 2012/0176340 A1 Jul. 12, 2012

(30) Foreign Application Priority Data

Jan. 10, 2011 (TW) .............................. 100100835 A

(51) Int. Cl.
*G06F 3/042* (2006.01)
(52) U.S. Cl.
CPC ...................................... *G06F 3/042* (2013.01)
USPC ........................................ 345/173; 178/18.09
(58) Field of Classification Search
CPC ..... G06F 3/041; G06F 3/0421; G06F 3/0423; G06F 3/04238
USPC ...................... 178/18.01–18.09; 345/173–178
See application file for complete search history.

(56) References Cited

U.S. PATENT DOCUMENTS

| | | | | |
|---|---|---|---|---|
| 5,317,140 A | * | 5/1994 | Dunthorn | 250/221 |
| 6,008,798 A | * | 12/1999 | Mato et al. | 345/168 |
| 6,498,602 B1 | * | 12/2002 | Ogawa | 345/173 |
| 7,113,174 B1 | * | 9/2006 | Takekawa et al. | 345/173 |
| 2005/0052635 A1 | * | 3/2005 | Xie et al. | 356/3.07 |
| 2010/0245264 A1 | | 9/2010 | Wu et al. | |
| 2010/0277436 A1 | * | 11/2010 | Feng et al. | 345/175 |
| 2010/0328243 A1 | * | 12/2010 | Wang et al. | 345/173 |
| 2012/0001871 A1 | * | 1/2012 | Chang et al. | 345/175 |

FOREIGN PATENT DOCUMENTS

| | | |
|---|---|---|
| TW | 200525433 | 8/2005 |
| TW | M338402 | 8/2008 |
| TW | 20103581 | 10/2010 |
| TW | 201035831 | 10/2010 |
| WO | WO 2010108304 A1 * | 9/2010 |

OTHER PUBLICATIONS

"Office Action of Taiwan Counterpart Application", issued on Nov. 14, 2013, p. 1-p. 7.

* cited by examiner

*Primary Examiner* — Amare Mengistu
*Assistant Examiner* — Stacy Khoo
(74) *Attorney, Agent, or Firm* — Jianq Chyun IP Office

(57) ABSTRACT

A touch module including an image sensing unit, a plurality of first reflecting elements, a plurality of second reflecting elements, and a processing unit is provided. The image sensing unit is positioned in correspondence with a first corner of a sensing area and capable of capturing a sensing image to output an image signal. The first reflecting elements and the second reflecting elements respectively have different first angles and different second angles, are disposed along a first and the second edges of the sensing area respectively, and are capable of reflecting a touch object to form a first and a second image in the sensing image. A second corner formed by the first the second edges is diagonal to the first corner. The processing unit is coupled the image sensing unit and receives the image signal to determine the position of the touch object relative to the sensing area.

13 Claims, 2 Drawing Sheets

TOUCH MODULE AND TOUCH DETECTING METHOD

CROSS-REFERENCE TO RELATED APPLICATION

This application claims the priority benefit of Taiwan application serial no. 100100835, filed on Jan. 10, 2011. The entirety of the above-mentioned patent application is hereby incorporated by reference herein and made a part of this specification.

BACKGROUND OF THE INVENTION

1. Field of the Invention

The invention relates to a touch module and a touch detecting method, and more particularly, to an optical touch module and an optical touch detecting method.

2. Description of Related Art

Touch panels may be generally classified into the types of resistive touch panels, capacitive touch panels, optical touch panels, sonic touch panels and electromagnetic touch panels according to the detecting manner. Because the touch mechanism of the optical touch panels is suitable for large-sized display panels, most large-sized display panel's touch function is achieved by optical touch mechanism. In general, optical touch panels typically employ camera devices as sensing elements, and the camera devices are usually disposed at least two corners of a sensing area such that the position of a touch point is calculated according to two angles of the touch point sensed by the camera devices.

Taiwan Patent No. 201035831 provides a touch device utilizing a plurality of reflecting mirrors to divide a laser light source into a plurality of parallel laser beams that are sensed by a plurality of sensing units. Taiwan Patent No. M338402 provides an optical reflective image sensing panel device which includes reflecting mirrors disposed at two adjacent corners for reflecting the touch object's image to an image sensor, thereby calculating the coordinate of the touch object according to the sensed image. U.S. Patent Application Publication No. 20100245264 provides an optical detecting apparatus which includes a scan module and a detector disposed at two adjacent corners. The scan module rotates reflecting mirrors to project light to different angles. The detector receives light reflected by a touch object, thereby obtaining the angle of the touch object and calculating the position of the touch object according to the obtained angle.

SUMMARY OF THE INVENTION

Accordingly, the invention is directed to a touch module which could achieve the optical touch function by using an image sensing unit and a plurality of reflecting elements.

The invention is also directed to a touch detecting method which could achieve the optical touch function by rotating a plurality of reflecting elements to reflect an image of a touch object to an image sensing unit to determine the position of the touch object relative to a sensing area.

Additional aspects and advantages of the invention will be set forth in the description of the techniques disclosed in the invention.

To achieve one of or all aforementioned and other advantages, an embodiment of the invention provides a touch module including an image sensing unit, a plurality of first reflecting elements, a plurality of second reflecting elements, and a processing unit. The image sensing unit is positioned in correspondence with a first corner of a sensing area and capable of capturing a sensing image to output an image signal. The first reflecting elements are disposed along a first edge of the sensing area. Each of the first reflecting elements has a different first angle. One of the first reflecting elements is capable of reflecting a touch object to form a first image in the sensing image. The second reflecting elements are disposed along a second edge of the sensing area. Each of the second reflecting elements has a different second angle. One of the second reflecting elements is capable of reflecting the touch object to form a second image in the sensing image. A second corner formed by the first edge and the second edge is diagonal to the first corner. The processing unit is coupled to the image sensing unit and capable of receiving the image signal and determine the position of the touch object relative to the sensing area based on the image signal.

To achieve one of or all aforementioned and other advantages, Another embodiment of the invention provides a touch detecting method adapted for a touch module including an image sensing unit, a plurality of first reflecting elements, and a plurality of second reflecting elements. The image sensing unit is disposed in correspondence with a first corner of a sensing area and capable of capturing a sensing image to output an image signal. The first reflecting elements and the second reflecting elements are disposed along a first edge and a second edge of the sensing area respectively. A second corner formed by the first edge and the second edge is diagonal to the first angle. In the touch detecting method, the first reflecting elements are rotated such that the first reflecting elements have different first angles, one of the first reflecting elements capable of reflecting a touch object to form a first image in the sensing image. The second reflecting elements are rotated such that the second reflecting elements have different second angles, one of the second reflecting elements capable of reflecting the touch object to form a second image in the sensing image. The image signal is processed to determine the position of the touch object relative to the sensing area.

In view of the foregoing, in embodiments of the invention, the image sensing unit of the touch module is disposed at the first corner of the sensing area, and the first reflecting elements and the second reflecting elements are disposed along the first edge and the second edge of the second corner that is diagonal to the first corner. In the touch detecting method, the image of the touch object is reflected by the first reflecting elements and the second reflecting elements to form the first image and the second image, and the X-axis position and Y-axis position of the touch point of the touch object are calculated according to the first image and the second image. Thus, the touch module could achieve the optical touch function by using a single image sensing unit for reducing the hardware cost.

Other objectives, features and advantages of the invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

It is to be understood that other embodiment may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings.

Figure 1:
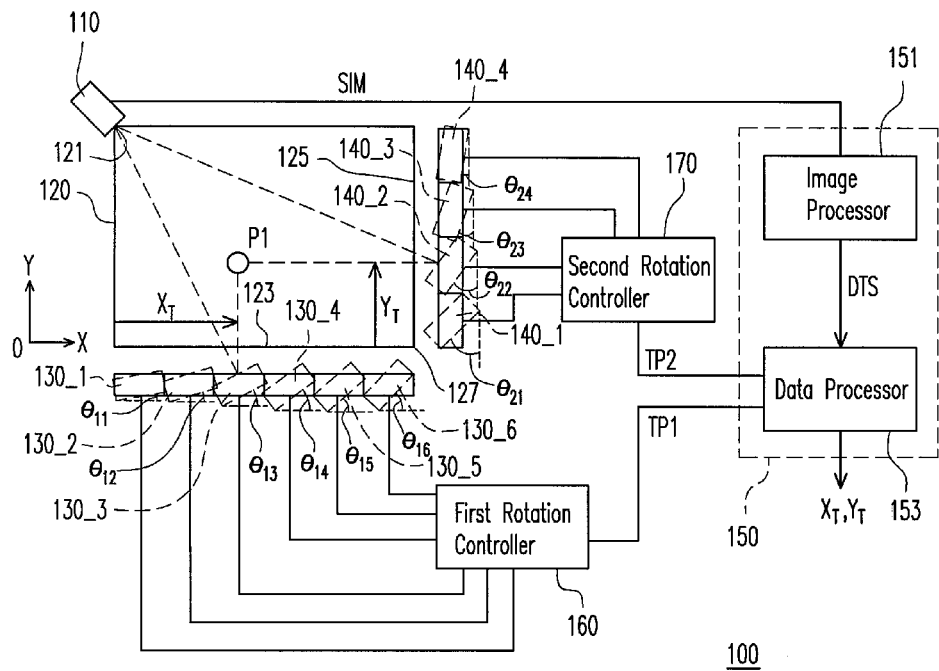
FIG. 1 is a system diagram of a touch module according to one embodiment of the invention.

FIG. 1 is a system diagram of a touch module according to one embodiment of the invention. Referring to FIG. 1, in the embodiment, the touch module 100 includes an image sensing unit 110, a plurality of first reflecting elements (e.g. elements 130_1 to 130_6), a plurality of second reflecting elements (e.g. elements 140_1 to 140_4), a processing unit 150, a first rotation controller 160, and a second rotation controller 170. The image sensing unit 110 is disposed beside a first corner 121 of a sensing area 120 and is capable of detecting the sensing area 120 to capture a sensing image so as to output an image signal SIM. The image sensing unit 110 may be a camera, photosensors arranged in a two-dimensional array, or photosensors arranged in a one-dimensional array and people skilled in the art could determine the type of image sensing unit which to be used.

The first reflecting elements 130_1 to 130_6 are sequentially arranged along a first edge 123 of the sensing area 120, and the second reflecting elements 140_1 to 140_4 are sequentially arranged along a second edge 125 of the sensing area 120. A second corner 127 formed by the first edge 123 and the second edge 125 is diagonal to the first corner 121.

The first rotation controller 160 is coupled to the first reflecting elements 130_1 to 130_6 and capable of rotating the first reflecting elements 130_1 to 130_6 sequentially, i.e. to rotate the first reflecting elements 130_1 to 130_6 in sequence from the first reflecting elements 130_1 to 130_6, such that the angles (with respect to the horizontal dotted line in parallel with the first edge 123) of the rotated first reflecting elements 130_1 to 130_6 (the first reflecting elements 130_1 to 130_6 as shown by broken lines) are corresponding first angles (e.g. $\theta_{11}$ to $\theta_{16}$) respectively.

In the embodiment, the first angles $\theta_{11}$ to $\theta_{16}$ are different from each other. For example, the first angles $\theta_{11}$ to $\theta_{16}$ gradually increase in the direction away from the first corner 121, and when the angles of the rotated first reflecting elements 130_1 to 130_6 correspond with the first angles $\theta_{11}$ to $\theta_{16}$ (as if the angles of the first reflecting elements 130_1 to 130_6 are set to the first angles $\theta_{11}$ to $\theta_{16}$ respectively), the first reflecting elements 130_1 to 130_6 could reflect an image of a touch object, having the same horizontal position (i.e. X-axis position) as the first reflecting elements 130_1 to 130_6, to the image sensing unit 110 for forming a first image in the sensing image. It should be understood that the first angles $\theta_{11}$ to $\theta_{16}$ shown in FIG. 1 are illustrative rather than limiting.

When each of the first reflecting elements (e.g. elements 130_1 to 130_6) is rotated, the first rotation controller 160 outputs a first rotation position parameter TP1 which may be an X-axis position (i.e. a first axial position) of the rotated first reflecting element 130_1 to 130_6. In addition, the first rotation controller 160 restores each first reflecting element (e.g. element 130_1 to 130_6) to an initial position (i.e. a first initial position) after rotation of each first reflect element (e.g. element 130_1 to 130_6). The first reflecting elements 130_1 to 130_6 restored to the initial position, i.e. the first reflecting elements 130_1 to 130_6 as shown by solid lines, may be positioned in parallel with the first edge 123.

The second rotation controller 170 is coupled to the second reflecting elements 140_1 to 140_4 and capable of sequentially rotating the second reflecting elements 140_1 to 140_4, i.e. to rotate the second reflecting elements 140_1 to 140_4 in sequence from the second reflecting elements 140_1 to 140_4, such that the angles (with respect to the vertical dotted line in parallel with the second edge 125) of the rotated second reflecting elements 140_1 to 140_4 (the second reflecting elements 140_1 to 140_4 as shown by broken lines) are corresponding second angles (e.g. $\theta_{21}$ to $\theta_{24}$) respectively.

In the embodiment, the second angles $\theta_{21}$ to $\theta_{24}$ are different from each other. For example, the second angles $\theta_{21}$ to $\theta_{24}$ gradually increase in the direction away from the first corner 121, and when the angles of the rotated second reflecting elements 140_1 to 140_4 corresponding with the second angles $\theta_{21}$ to $\theta_{24}$ (as if the angles of the second reflecting elements 140_1 to 140_4 are set to the second angles $\theta_{21}$ to $\theta_{24}$, respectively), the second reflecting elements 140_1 to 140_4 could reflect an image of a touch object having the same vertical position (i.e. Y-axis position) as the second reflecting elements 140_1 to 140_4 to the image sensing unit 110 for forming a second image in the sensing image. It should be understood that the second angles $\theta_{21}$ to $\theta_{24}$ shown in FIG. 1 are illustrative rather than limiting.

When each of the second reflecting elements (e.g. elements 140_1 to 140_4) is rotated, the second rotation controller 170 outputs a second rotation position parameter TP2 which may be a Y-axis position (i.e. a second axial position) of the second reflecting element 140_1 to 140_4. In addition, the second rotation controller 170 restores each second reflecting element (e.g. element 140_1 to 140_4) to an initial position (i.e. a second initial position) after rotation of each second reflect element (e.g. element 140_1 to 140_4). The second reflecting elements 140_1 to 140_4 restored to the initial position, i.e. the second reflecting elements 140_1 to 140_4 as shown by solid lines, may be positioned in parallel with the second edge 125.

The processing unit 150 is coupled to the image sensing unit 110 and capable of receiving the image signal SIM. When a first image appears in the sensing image, the processing unit 150 calculates the X-axis position (e.g. $X_T$) of a touch point (e.g. P1) of a touch object according to the first rotation position parameter TP1. When a second image appears in the sensing image, the processing unit 150 calculates the Y-axis position (e.g. $Y_T$) of the touch point (e.g. P1) of the touch object according to the second rotation position parameter TP2.

For example, it is assumed that the touch point of the touch object is P1. When the first rotation controller 160 rotates the first reflecting element 130_1, because the X-axis position $X_T$ of the touch point P1 is different from the X-axis position of the first reflecting element 130_1, the image of the touch object is not reflected. Next, the first rotation controller 160 restores the first reflecting element 130_1 to an initial position thereof. When the first rotation controller 160 rotates the first reflecting element 130_2, because the X-axis position $X_T$ of the touch point P1 is different from the X-axis position of the first reflecting element 130_2, the image of the touch object is not reflected, either. Next, the first rotation controller 160 restores the first reflecting element 130_2 to an initial position thereof.

When the first rotation controller 160 rotates the first reflecting element 130_3, because the X-axis position $X_T$ of the touch point P1 is the same as the X-axis position of the first reflecting element 130_3, the image of the touch object is reflected such that a first image appears in the sensing image. At this time, the processing unit 150 detects the first image and considers the X-axis position of the first reflecting element 130_3 (transmitted via the first rotation position parameter TP1) as the X-axis position $X_T$ of the touch point P1. Next, the first rotation controller 160 restores the first reflecting element 130_3 to an initial position thereof. After the X-axis position $X_T$ of the touch point P1 is detected, the first rotation controller 160 may stop rotating the remaining first reflecting elements (e.g. elements 130_4 to 130_6), or may continue to rotate the remaining first elements (e.g. elements 130_4 to 130_6), depending upon actual needs.

On the other hand, when the second rotation controller 170 rotates the second reflecting element 140_1, because the Y-axis position $Y_T$ of the touch point P1 is different from the Y-axis position of the second reflecting element 140_1, the image of the touch object is not reflected. Next, the second rotation controller 170 restores the second reflecting element 140_1 to an initial position thereof. When the second rotation controller 170 rotates the second reflecting element 140_2, because the Y-axis position $Y_T$ of the touch point P1 is the same as the Y-axis position of the second reflecting element 140_2, the image of the touch object is reflected such that a second image appears in the sensing image. At this time, the processing unit 150 detects the second image and considers the Y-axis position of the second reflecting element 140_2 (transmitted via the second rotation position parameter TP2) as the Y-axis position $Y_T$ of the touch point P1. Next, the second rotation controller 170 restores the second reflecting element 140_2 to an initial position thereof. Similarly, after the Y-axis position $Y_T$ of the touch point P1 is detected, the second rotation controller 170 may stop rotating the remaining second reflecting elements (e.g. elements 140_3 and 140_4), or may continue to rotate the remaining second reflecting elements (e.g. elements 140_3 and 140_4), depending upon actual needs. It is noted that each of the first reflecting elements 130_1 to 130_6 and the second reflecting elements 140_1 and 140_4 could be rotated randomly, which could still achieve the results as in the above embodiment.

In addition, in the above embodiment, if the processing unit 150 is designed not to be able to detect the first image and the second image at the same time, i.e. it is designed to be able to detect a single image, the touch module may be configured such that the second reflecting elements 140_1 to 140_4 are rotated after all the first reflecting elements 130_1 to 130_6 have been rotated or after the X-axis position $X_T$ of the touch point P1 has been detected, or the first reflecting elements 130_1 to 130_6 are rotated after all the second reflecting elements 140_1 to 140_4 have been rotated or after the Y-axis position $Y_T$ of the touch point P1 has been detected. In this case, the duration which the first reflecting elements 130_1 to 130_6 are being rotated does not overlap with the duration which the second reflecting elements 140_1 to 140_4 are being rotated. On the contrary, if the processing unit 150 is designed to be able to detect the first image and the second image at the same time, the first reflecting elements 130_1 to 130_6 and the second reflecting elements 140_1 to 140_4 may be sequentially rotated in the same duration and, in this case, the duration which the first reflecting elements 130_1 to 130_6 are being rotated overlaps with the duration which the second reflecting elements 140_1 to 140_4 are being rotated.

More specifically, the processing unit 150 includes an image processor 151 and a data processor 153. The image processor 151 is coupled to the image sensing unit 110 and capable of detecting whether a first image and a second image appear in the sensing image, and output a detecting signal DTS to transmit a detecting result. The data processor 153 is coupled to the image processor 151, the first rotation controller 160 and the second rotation controller 170 to determine, based on the detecting signal DTS, whether to calculate the X-axis position and Y-axis position of a touch point (e.g. P1) of a touch object according to the first rotation position parameter TP1 and the second rotation position parameter TP2.

In other words, upon detecting a first image in the sensing image, the image processor 151 notifies the data processor 153 via the detecting signal DTS, and the data processor 153 considers the received first rotation position parameter TP1 as the X-axis position of the touch point (e.g. P1); upon detecting a second image in the sensing image, the image processor 151 notifies the data processor 153 via the detecting signal DTS, and the data processor 153 considers the received second rotation position parameter TP2 as the Y-axis position of the touch point (e.g. P1).

Figure 2:
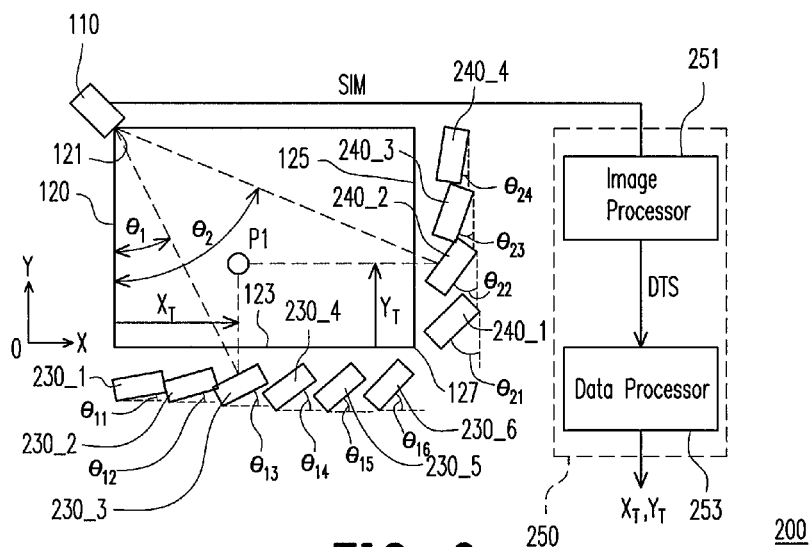
FIG. 2 is a system diagram of a touch module according to another embodiment of the invention.

FIG. 2 is a system diagram of a touch module according to another embodiment of the invention. Referring to FIG. 1 and FIG. 2, the difference between the embodiment and the previous embodiment is the first reflecting elements 230_1 to 230_6, the second reflecting elements 240_1 to 240_4, and a processing unit 250. In the embodiment, the angles of the first reflecting elements 230_1 to 230_6 are fixed to first angles θ11~θ16 respectively, and the angles of the second reflecting elements 240_1 to 240_4 are fixed to second angles θ21~θ24 respectively. Each of the first reflecting elements 230_1 to 230_6 and the second reflecting elements 240_1 to 240_4 is, for example, a reflecting mirror.

Assuming the touch object touches the touch point P1, the image of the touch object is reflected by the reflecting element 230_3 to form a first image in the sensing image, and the image of the touch object is reflected by the reflecting element 240_2 to form a second image in the sensing image. At this time, the processing unit 250 calculates a first touch angle $\theta_1$ according to the first image in the sensing image, and calculates a second touch angle $\theta_2$ according to the second image in the sensing image. The processing unit 250 then calculates the X-axis position $X_T$ of the touch point P1 according to the first touch angle $\theta_1$ and calculates the Y-axis position $Y_T$ of the touch point P1 according to the second touch angle $\theta_2$.

More specifically, the processing unit 250 includes an image processor 251 and a data processor 253. The image processor 251 is coupled to the image sensing unit 110 and capable of detecting whether a first image and a second image appear in the sensing image. When a first image and a second image appear in the sensing image, the image processor 251 calculates a first touch angle $\theta_1$ according to the first image and calculates a second touch angle $\theta_2$ according to the second image, and outputs a detecting signal DTS to transmit the first touch angle $\theta_1$ and the second touch angle $\theta_2$. The data processor 253 is coupled to the image processor 251 to calculate the X-axis position (e.g. $X_T$) associated with the touch point (e.g. P1) of the touch object according to the first touch angle $\theta_1$, and calculate the Y-axis position (e.g. $Y_T$) associated with the touch point (e.g. P1) of the touch object according to the second touch angle $\theta_2$.

The calculation of the first touch angle $\theta_1$ and the second touch angle $\theta_2$ by the image processor 251 is further described below. When a first image appears in the sensing image, the image processor 251 may obtain the first touch angle $\theta_1$ by looking up in a look-up table according to the horizontal position of the first image in the sensing image or by computation. Likewise, when a second image appears in the sensing image, the image processor 251 may obtain the second touch angle $\theta_2$ by looking up in a look-up table according to the horizontal position of the second image in the sensing image or by computation.

For example, assuming the image sensing unit 110 includes photosensors arranged in a one-dimensional array (e.g. 90×1 array), the sensing range of each photosensor is about 1 degree (i.e. 90/90) wide. In addition, assuming the angles associated with the photosensors arranged in the 90×1 array increases gradually, i.e. the angle of each photosensor ranges from 0 to 90 degrees. In this case, if the first image is detected by the 34th photosensor, then the first touch angle $\theta_1$ is 34 degrees. If the first angle is detected by the 56th photosensor, then the first touch angle $\theta_1$ is 56 degrees.

In another implementation, if the image sensing unit 110 includes photosensors arranged in a 500×1 array, the sensing range of each photosensor is substantially 0.18 degree (i.e. 90/500) wide. In addition, if the angles associated with the photosensors arranged in the 500×1 array increases gradually, i.e. the angle of each photosensor ranges from 0 to 90 degrees. In this case, if the first image is detected by the 304th photosensor, then the first touch angle $\theta_1$ is 54.72 degrees. If the first image is detected by the 456th photosensor, the first touch angle $\theta_1$ is 82.08 degrees. Likewise, the second touch angle $\theta_2$ may be calculated in the same manner as the calculation of the first touch angle $\theta_1$.

While the image sensing unit 110 is illustrated as a one-dimensional photosensor array in this embodiment, it is noted, however, that the image sensing unit 110 may be implemented in a different manner (e.g. modifying the size of the array or changing the elements of the sensing unit). In other embodiments as long as the first touch angle $\theta_1$ and the second touch angle $\theta_2$ could be calculated according to the horizontal positions of the first image and the second image in the sensing image, and the position of the touch point P1 relative to the sensing area 120 could be obtained through trigonometric function computation by the data processor 253.

Figure 3:
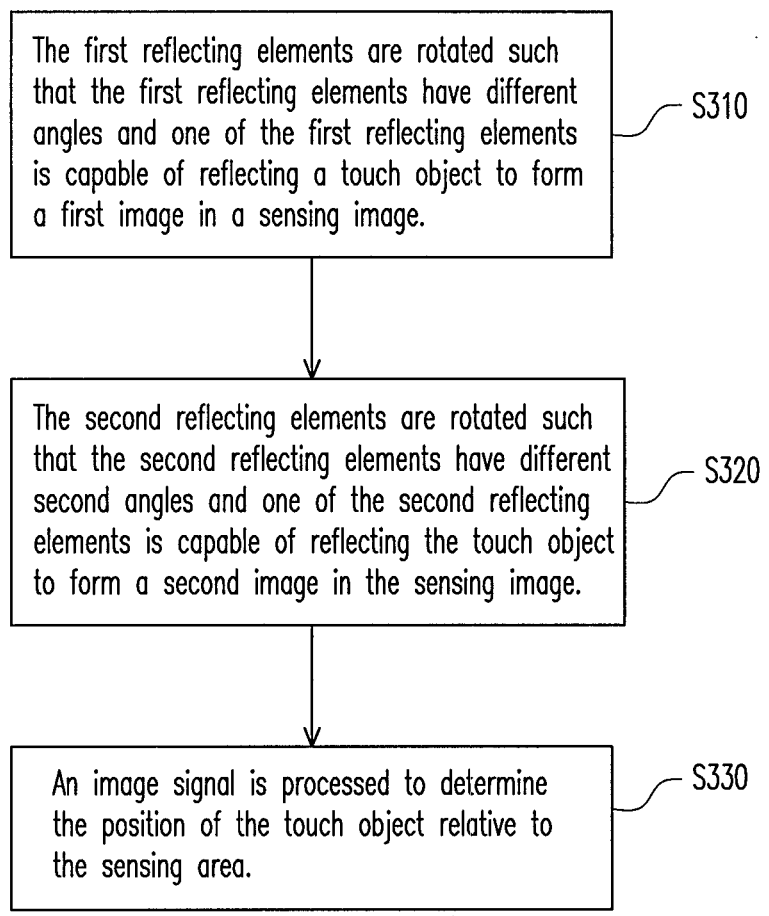
FIG. 3 is a flow chart of a touch detecting method according to one embodiment of the invention.

A touch detecting method for applying in the touch module 100 is discussed below, which is derived from the above description. FIG. 3 is a flow chart of a touch detecting method according to one embodiment of the invention. Referring to FIG. 3, in the embodiment, the touch detecting method includes the following steps. The first reflecting elements are rotated such that the first reflecting elements have different angles and one of the first reflecting elements is capable of reflecting a touch object to form a first image in a sensing image (step S310). The second reflecting elements are rotated such that the second reflecting elements have different second angles and one of the second reflecting elements is capable of reflecting the touch object to form a second image in the sensing image (step S320). An image signal is processed to determine the position of the touch object relative to the sensing area (step S330). For details of the above steps, it is suggested to refer to the description with respect to the touch module 100. For example, the first reflecting elements and the second reflecting elements may be sequentially or randomly rotated. Explanation of these details is not repeated herein. In addition, the order of the above steps is illustrative rather than limiting.

In summary, in the touch module of at least one of the embodiments, an image sensing unit is disposed at a first corner of a sensing area, and a plurality of first reflecting elements and a plurality of second reflecting elements are disposed along a first edge and a second edge of a second corner that is diagonal to the first corner, such that an image of a touch object is reflected by the first reflecting element and the second reflecting element to form a first image and a second image, and the X-axis position and Y-axis position of a touch point of the touch object are calculated according to the first image and the second image. Thus, the touch module could achieve the optical touch function by using a single image sensing unit thus reducing the hardware cost. In addition, in another embodiment of the touch module and touch detecting method, the first reflecting elements and the second reflecting elements are rotated to determine whether the positions of the first reflecting elements and the second reflecting elements correspond to the X-axis position and Y-axis position of the touch point are adjudged by determining whether the rotated first reflecting elements and second reflecting elements form a first image and a second image in the sensing image, respectively. Therefore, the accuracy of detecting the X-axis position and Y-axis position of the touch point could be increased.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention," "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the present disclosure is intended to be dedicated to the public regardless of whether the element or component is explicitly recited in the following claims.

What is claimed is:

1. A touch module comprising:
   an image sensing unit positioned in correspondence with a first corner of a sensing area and capable of capturing a sensing image to output an image signal;
   a plurality of first reflecting elements disposed along a first edge of the sensing area, each of the first reflecting elements having a different first angle, and one of the first reflecting elements capable of reflecting an image of a touch object to the image sensing unit for forming a first image in the sensing image;
   a plurality of second reflecting elements disposed along a second edge of the sensing area, each of the second reflecting elements having a different second angle, and one of the second reflecting elements capable of reflecting the image of the touch object to the image sensing unit for forming a second image in the sensing image, a second corner formed by the first edge and the second edge being diagonal to the first corner; and
   a processing unit coupled to the image sensing unit and capable of receiving the image signal and determine the position of the touch object relative to the sensing area based on the image signal.

2. The touch module according to claim 1, further comprising:
   a first rotation controller coupled to the first reflecting elements and capable of rotating the first reflecting elements such that the first reflecting elements have the different first angles, the first rotation controller capable of outputting a first rotation position parameter; and
   a second rotation controller coupled to the second reflecting elements and capable of rotating the second reflecting elements such that the second reflecting elements have the different second angles, the second rotation controller capable of outputting a second rotation position parameter;
   wherein the processing unit calculates a first axial position associated with the touch object according to the first rotation position parameter when the first image appears in the sensing image, and the processing unit calculates a second axial position associated with the touch object according to the second rotation position parameter when the second image appears in the sensing image.

3. The touch module according to claim 2, wherein the first rotation position parameter is a first axial position of the rotated first reflecting element, and the second rotation position parameter is a second axial position of the rotated second reflecting element.

4. The touch module according to claim 2, wherein the processing unit comprises:
   an image processor coupled to the image sensing unit and capable of detecting whether the first image and the second image appear in the sensing image to output a detecting signal thereby; and
   a data processor coupled to the image processor, the first rotation controller, and the second rotation controller, the data processor capable of calculating the first axial position and the second axial position of the touch object according to the detecting signal, the first rotation position parameter, and the second rotation position parameter.

5. The touch module according to claim 1, wherein the different first angle of each of the first reflecting elements increases gradually in a direction away from the first corner, and the different second angle of each of the second reflecting elements increases gradually in a direction away from the first corner.

6. The touch module according to claim 1, wherein the angle of each of the first reflecting elements is fixed to the corresponding first angle, and the angle of each of the second reflecting elements is fixed to the corresponding second angle.

7. The touch module according to claim 6, wherein the processing unit comprises:
   an image processor coupled to the image sensing unit, the image processor capable of calculating a first touch angle according to the first image and calculating a second touch angle according to the second image and outputting a detecting signal; and
   a data processor coupled to the image processor, the data processor capable of calculating a first axial position of the touch object according to the first touch angle and calculating a second axial position of the touch object according to the second touch angle.

8. The touch module according to claim 1, wherein each of the first reflecting elements and the second reflecting elements is a reflecting mirror.

9. The touch module according to claim 1, wherein the image sensing unit comprises a two-dimensional photosensor.

10. The touch module according to claim 1, wherein the image sensing unit comprises a one-dimensional photosensor.

11. A touch detecting method adapted for a touch module comprising an image sensing unit, a plurality of first reflecting elements, and a plurality of second reflecting elements, the image sensing unit disposed in correspondence with a first corner of a sensing area and capable of capturing a sensing image to output an image signal, the first reflecting elements and the second reflecting elements disposed along a first edge and a second edge of the sensing area respectively, a second corner formed by the first edge and the second edge being diagonal to the first corner, the touch detecting method comprising:
   rotating the first reflecting elements such that the first reflecting elements have different first angles, one of the first reflecting elements capable of reflecting an image of a touch object to the image sensing unit for forming a first image in the sensing image;
   rotating the second reflecting elements such that the second reflecting elements have different second angles, one of the second reflecting elements capable of reflecting the image of the touch object to the image sensing unit for forming a second image in the sensing image; and
   processing the image signal to determine the position of the touch object relative to the sensing area.

12. The touch detecting method according to claim 11, wherein duration of rotating the first reflecting elements overlaps duration of rotating the second reflecting elements.

13. The touch detecting method according to claim 11, wherein duration of rotating the first reflecting elements is staggered with a duration of rotating the second reflecting elements.

* * * * *